United States Patent
Rasbornig et al.

(10) Patent No.: US 11,804,951 B2
(45) Date of Patent: Oct. 31, 2023

(54) ADVANCED SENSOR SECURITY PROTOCOL

(71) Applicant: Infineon Technologies AG, Neubiberg (DE)

(72) Inventors: Friedrich Rasbornig, Klagenfurt (AT); Hans-Joerg Wagner, Villach (AT); Dirk Hammerschmidt, Finkerstein (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 276 days.

(21) Appl. No.: 17/378,951

(22) Filed: Jul. 19, 2021

(65) Prior Publication Data
US 2023/0020730 A1 Jan. 19, 2023

(51) Int. Cl.
H04L 29/06 (2006.01)
H04L 9/06 (2006.01)
H04L 9/08 (2006.01)
H04L 9/12 (2006.01)
H04L 9/14 (2006.01)

(52) U.S. Cl.
CPC .......... *H04L 9/0643* (2013.01); *H04L 9/0863* (2013.01); *H04L 9/0869* (2013.01); *H04L 9/0894* (2013.01); *H04L 9/12* (2013.01); *H04L 9/14* (2013.01)

(58) Field of Classification Search
CPC ... H04L 9/0643; H04L 9/0863; H04L 9/0869; H04L 9/0894; H04L 9/12; H04L 9/14
See application file for complete search history.

(56) References Cited

U.S. PATENT DOCUMENTS

2002/0124169 A1* 9/2002 Agrawal ............ G06Q 20/3674
380/278
2008/0004762 A1* 1/2008 Seashore ............ G05B 19/0428
701/31.4

(Continued)

FOREIGN PATENT DOCUMENTS

KR 20070059904 A * 12/2007

OTHER PUBLICATIONS

B. Palaniswamy, S. Camtepe, E. Foo and J. Pieprzyk, "An Efficient Authentication Scheme for Intra-Vehicular Controller Area Network," in IEEE Transactions on Information Forensics and Security, vol. 15, pp. 3107-3122, 2020, doi: 10.1109/TIFS .2020.2983285. (Year: 2020).*

(Continued)

*Primary Examiner* — Shawnchoy Rahman
(74) *Attorney, Agent, or Firm* — Banner & Witcoff Ltd.

(57) ABSTRACT

The described techniques facilitate the secure transmission of sensor measurement data to an ECU by implementing an authentication procedure. The authentication procedure includes an integrated circuit (IC) generating authentication tags by encrypting portions of sensor measurement data. These authentication tags are then transmitted together with the sensor measurement data as authenticated sensor measurement data. The ECU may then use the authentication tags to authenticate the sensor measurement data based upon a comparison of the portions of the sensor measurement data sensor measurement data to the authentication tag that is expected to be generated for those portions of sensor measurement data.

25 Claims, 10 Drawing Sheets

(56) References Cited

U.S. PATENT DOCUMENTS

| | | | |
|---|---|---|---|
| 2016/0379430 A1* | 12/2016 | Kimura | G07C 9/00309 |
| | | | 340/5.61 |
| 2017/0250961 A1 | 8/2017 | Rasbornig | |
| 2020/0284883 A1* | 9/2020 | Ferreira | G01S 17/10 |
| 2021/0039594 A1* | 2/2021 | Kato | B60R 25/24 |
| 2021/0226773 A1* | 7/2021 | Snow | H04L 9/0869 |
| 2021/0370877 A1* | 12/2021 | Peterson | B60R 16/023 |
| 2022/0006641 A1* | 1/2022 | Snow | H04L 9/3239 |
| 2022/0124491 A1* | 4/2022 | Yung | H04W 12/0471 |

OTHER PUBLICATIONS

Groza, Bogdan, and Pal-Stefan Murvay. "Identity-Based Key Exchange on In-Vehicle Networks: CAN-FD & FlexRay." Sensors (Basel, Switzerland) 19.22 (2019): 4919-. Web. (Year: 2019).*

* cited by examiner

ADVANCED SENSOR SECURITY PROTOCOL

TECHNICAL FIELD

Aspects described herein generally relate to the use of sensor data authentication to secure sensor data transmissions.

BACKGROUND

Current sensor product solutions provide sensor measurement data to an electronic control unit (ECU) without any encryption and/or additional security features. Typically, standard protocols are used for such communications, and the data content setup can be readily identified in the corresponding standards or datasheets of the sensor product manufacturers. A user may thus maliciously exploit this information to perform a "man in the middle" attack by analyzing the communications between a sensor and an ECU. A user may also attempt to circumvent licensing agreements by replacing a sensor with a compatible third party device. As another more nefarious example, a user may intentionally generate incorrect sensor data that is transmitted to an ECU, which may cause the components controlled by the ECU to perform dangerous or even fatal actions depending upon the particular application (e.g. automotive ECUs that control braking, steering, etc.).

Current solutions that attempt to remedy such issues include the use of message authentication via Message Authentication Code (MAC) implementation. However these solutions always provide the same authentication code for the same measurement value, and thus are easy to circumvent via a replay attack. Furthermore, for some applications such as Automotive Safety Integrity Level (ASIL) standards, additional delays resulting from the use of MAC messages present difficulties to ensure that strict ASIL minimum time periods are satisfied. As a result, current sensor measurement interfaces lack appropriate security measures and are inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Again, various applications rely upon data interfaces between sensors and an ECU, and the addition of MAC messages may be easily circumvented and increase system latency. Thus, the embodiments described herein address these issues by implementing an authentication mechanism that enables the secure transfer of sensor measurement data between an integrated circuit (e.g. a sensor-based application-specific integrated circuit (ASIC)) and ECU. The embodiments as described herein may be implemented in accordance with any suitable number and/or type of communication protocols, and may implement any suitable number and/or type of data interfaces in accordance with such protocols, such as single- and bi-directional sensor protocols, for instance. The embodiments discussed in detail herein utilize authentication mechanisms that are known a priori by a sensor-based IC and an ECU to prevent replacement of a sensor-based IC with a third party/malicious sensor device. Thus, the embodiments discussed herein provide a cost- and complexity-efficient solution to implement additional security features and thus avoid unwanted replacement of the sensor device by third party products, as well as securing the protection of the sensor measurement data transmitted to an ECU.

To do so, the embodiments as discussed herein may utilize standard or known communication protocols but implement an authentication mechanism that generates authentication tags using portions of the sensor measurement data. These authentication tags are then transmitted together with the sensor measurement data as authenticated sensor measurement data. The authentication tags may be generated by the IC transmitting the sensor measurement data to the ECU, and may represent an encryption, hash, etc. of a predetermined portion of the sensor measurement data using various types of encryption techniques, as discussed in further detail herein. Because the encryption scheme is known a priori by the ECU, the ECU may use the authentication tag to authenticate the sensor measurement data transmissions.

DETAILED DESCRIPTION

In the following description, numerous specific details are set forth to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1A:
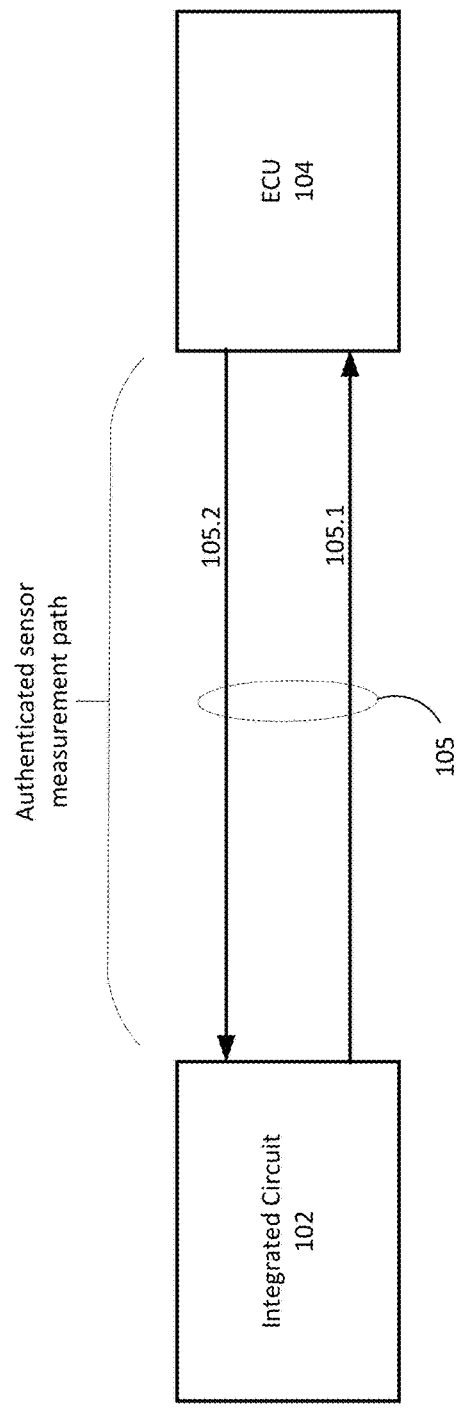
FIG. 1A illustrates one example of a secure sensor protocol interface architecture, in accordance with one or more embodiments of the disclosure.

FIG. 1A illustrates one example of a secure sensor protocol interface architecture, in accordance with one or more embodiments of the disclosure. The sensor protocol interface architecture 100 as shown in FIG. 1A includes an integrated circuit (IC) 102 and an ECU 104 coupled to one another via a data interface 105, which represents an authenticated sensor measurement path. The IC 102 may be implemented as a sensor ASIC, for instance. The IC 102 may implement sensors that are integrated as part of the IC 102 or receive sensor measurement data via sensors that are external to the IC 102, which are not shown in the Figures for purposes of brevity. In any event, the IC 102 may be implemented as any suitable type of hardware, software, or combinations of these, which function to enable the IC 102 to receive and/or generate authentication tags and sensor measurement data, which are both transmitted to the ECU 104 as authenticated sensor measurement data transmissions, as further discussed herein. The sensor data measurements may represent any suitable type of sensor measurements for any suitable number and/or type of applications, such as those used in the automotive industry, for instance.

The ECU 104 may be implemented as any suitable type of hardware, software, or combinations of these, which function to enable the ECU 104 to receive and authenticate the authenticated sensor measurement data transmissions received from the IC 102, as further discussed herein. The ECU 104 may be implemented as one of more processors and/or processing circuitry, and may execute computer-readable instructions to perform the various functions as discussed in further detail herein. The ECU 104 may thus be implemented using any suitable type of architecture and function in accordance with any suitable type of application that uses the sensor measurement data to perform specific functions.

As further discussed herein, each of the embodiments may implement an encryption scheme to generate an authentication tag. Each of these implementations uses, to some extent, a changing cryptographic random value, which may include the use of cryptographic "seed" or "salt" values that may further be combined with the use of other encryption techniques, such as a cryptographic hash function, to render replay attacks impossible, even if the cryptographic random value is known by an attacker. The embodiments described herein implement symmetric encryption techniques in which the IC 102 and the ECU 104 utilize the same cryptographic random value. To facilitate this functionality, the IC 102 and the ECU 104 implement the data interface 105 to communicate the cryptographic random value between one another.

The data interface 105 as shown in FIG. 1A includes two data interfaces 105.1, 105.2 by way of example and not limitation. Although two data interfaces are shown in FIG. 1A, the data interface 105 may represent any suitable number of data interfaces, each further comprising any suitable number and/or type of wires, buses, and/or respective terminals or pins of the IC 102 and the ECU 104 to enable communications between the IC 102 and the ECU 104 in accordance with any suitable number and/or type of communication protocols. Although the examples provided herein describe wired communication interfaces, this is by way of example and not limitation, and it will be appreciated that the concepts described herein are likewise applicable to a wireless communication between the respective data interfaces 105 of the IC 102 and the ECU 104.

The sensor protocol interface architecture 100 may implement the data interface 105 to support communications between the IC 102 and the ECU 104 using standard communication protocols such as a Single Edge Nibble Transmission (SENT) communication protocol interfaces such as those operating in accordance with the Society of Automotive Engineers (SAE) standards, a SENT communication protocol interface including Short PWM Code (SENT/SPC), a Controller Area Network (CAN bus) interface, a general purpose high speed protocols, a universal asynchronous receiver-transmitter (UART) interface, any suitable type of industrial field bus system interface, general purpose high speed protocols, etc.

As shown in FIG. 1A, the data interface 105 may comprise data interfaces 105.1, 105.2, each may be configured as a unidirectional data interface to enable communications between the IC 102 and the ECU 104 in the direction indicated by the arrows. This may be the case when, for instance, the data interface 105 is configured as a SENT interface, and the IC 102 and the ECU 104 are configured to communicate using the data interface 105 in accordance with the SENT communication protocol. In this example, the authenticated sensor measurement path may comprise a standard data interface 105.1 and a security data interface 105.2. The IC 102 is configured to perform authenticated sensor measurement data transmissions, which include generated authentication tags and sensor measurement data, to the ECU 104 via the standard data interface 105.1.

Moreover, the IC 102 is configured to receive security-related communications, such as a cryptographic random value, which may include a seed or salt value for instance, from the ECU 104 via the security data interface 105.2. In such an arrangement, the standard data interface 105.1 may represent a primary or main interface used by the IC 102, and the security data interface 105.2 may represent a test interface of the IC 102. Such a test interface may be implemented by the IC 102 in accordance with known techniques using the SENT protocol and an accompanying interface (or other suitable protocols/interfaces) to read out internal data or program a non-volatile memory (NVM) of the IC 102. Thus, and as further discussed herein, the IC 102 may implement non-volatile memory that stores a secret key used for the generation of the authentication tags, which may be programmed via the ECU 104 (or other suitable device), using the security data interface 105.2 in any suitable manner, such as during manufacturing of the IC 102 and ECU 104, on a production line, etc.

As further discussed herein, the IC 102 and/or the ECU 104 may transmit the cryptographic random value to one another, depending upon the particular implementation, and whether the IC 102 or the ECU 104 generates the cryptographic random value. Thus, the test interface as noted above (e.g. the security data interface 105.2) or, alternatively, the main interface (e.g. the standard data interface 105.1) may be implemented by the IC 102 and the ECU 104 such that the ECU 104 transmits the cryptographic random value to the IC 102, or vice-versa. The cryptographic random value may be transmitted from the ECU 104 to the IC 102, or vice-versa upon startup (e.g. initialization) of the IC 102, for instance, using either the standard data interface 105.1 or the security data interface 105.2 in accordance with any suitable communication interface and accompanying protocol, as noted above. In an embodiment, a slow message channel in accordance with the SENT or SENT/SPC communication interface and accompanying protocol may be implemented for this purpose via the ECU 104 facilitating partial transmissions of the cryptographic random value to the IC 102, or vice-versa. For example, the ECU 104 may implement a slow channel data transmission in accordance with a SENT communication protocol interface or a SENT/SPC communication protocol interface such that portions of the cryptographic random value are received over successive serial transmissions from the ECU 104 until the IC 102 receives the entirety of the cryptographic random value.

Figure 1B:
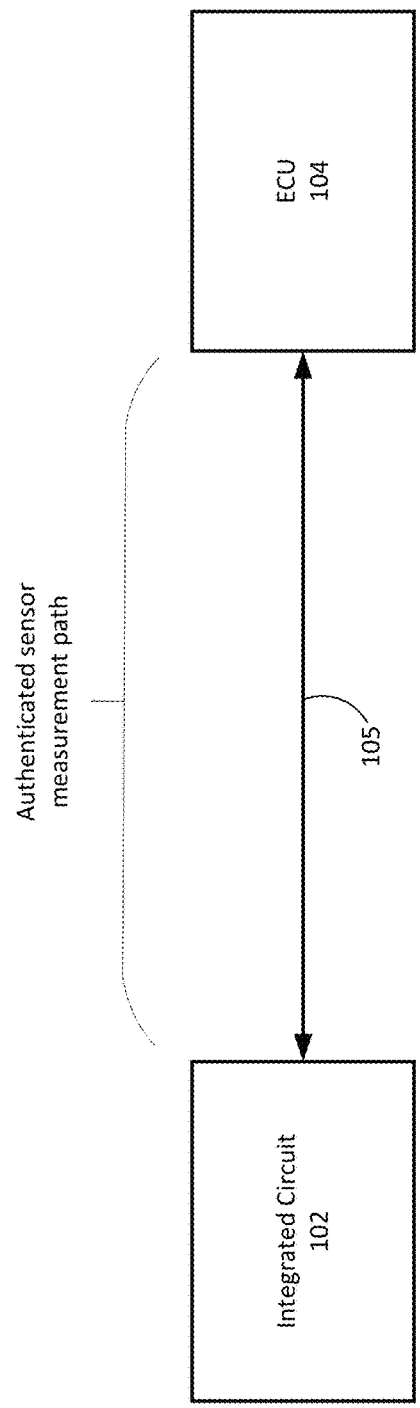
FIG. 1B illustrates another example of a secure sensor protocol interface architecture, in accordance with one or more embodiments of the disclosure.

FIG. 1B illustrates another example of a secure sensor protocol interface architecture, in accordance with one or more embodiments of the disclosure. The secure sensor protocol interface architecture 150 as shown in FIG. 1B operates in the same manner as the sensor protocol interface architecture 100 as shown in FIG. 1A, and therefore only differences between these two secure sensor protocol interfaces will be further described with respect to FIG. 1B. The secure sensor protocol interface architecture 150 as shown in FIG. 1B also implements an authenticated sensor measurement path, but does so in this example using a single data interface 105. The data interface 105 may represent in this example a combined standard and security interface, which may further comprise any suitable number and/or type of wires, buses, and/or respective terminals or pins of the IC 102 and the ECU 104 to enable communications between the IC 102 and the ECU 104 in accordance with any suitable number and/or type of communication protocols. Again, for clarity, the concepts described herein would likewise apply to wireless communication protocols.

For instance, the data interface 105 may be implemented as a bidirectional communication interface configured to support communications between the IC 102 and the ECU 104 in accordance with a communication protocol and accompanying interface that implements bidirectional data communications, as described above with reference to FIG. 1A. The use of the data interface 105 may be particularly useful, for instance, when a single terminal is available for communications between the IC 102 and the ECU 104. In this case, the IC 102 is configured to perform authenticated sensor measurement data transmissions, which include generated authentication tags and sensor measurement data that are transmitted to the ECU 104, as well as receiving cryptographic random values from the ECU 104 via the data interface 105, which may be implemented as a single wire connection.

Additionally or alternatively, and as further discussed below, the use of a bidirectional interface enables the IC 102 to locally generate cryptographic random values, which may then be transmitted to the ECU 104 to be used for authentication purposes. As another example, which may be particularly useful when the data interface 105 is configured as a SENT or SENT/SPC interface and the IC 102 and ECU 104 communicate in accordance with an accompanying communication protocol, the IC 102 may transmit the cryptographic random value to the ECU during a synchronization pulse (SYNC) time period in accordance with such protocols, which may be performed in lieu of transmitting a sensor address, for instance.

The IC 102 may generate the authentication tags as discussed herein in many different ways, which may then be transmitted together with the sensor measurement data as part of the authenticated sensor measurement data transmissions to the ECU 104. FIGS. 2A-2B, 3A-3B, and 4A-4B, which are further discussed below, illustrate additional details with respect to the manner in which the IC 102 may generate authentication tags and perform authenticated sensor measurement data transmissions to the ECU 104. The various techniques as discussed herein with reference to FIGS. 2A-2B, 3A-3B, and 4A-4B are provided by way of example and not limitation, and the IC 102 may perform authentication tag generation and authenticated sensor measurement data transmissions to the ECU 104 in accordance with any suitable techniques to facilitate the authentication of sensor measurement data received by the ECU 104. In each case, the ECU 104 is omitted for purposes of brevity and ease of explanation. However, in each of the FIGS. 2A-2B, 3A-3B, and 4A-4B, the IC 102 as shown and discussed herein with reference to FIGS. 1A-1B may perform authenticated sensor measurement data transmissions to the ECU 104 using any suitable communication interfaces, which is depicted in the FIGS. 2A-2B, 3A-3B, and 4A-4B as the data interface 105, and may implement any suitable accompanying communication protocols to do so.

Figure 2A:
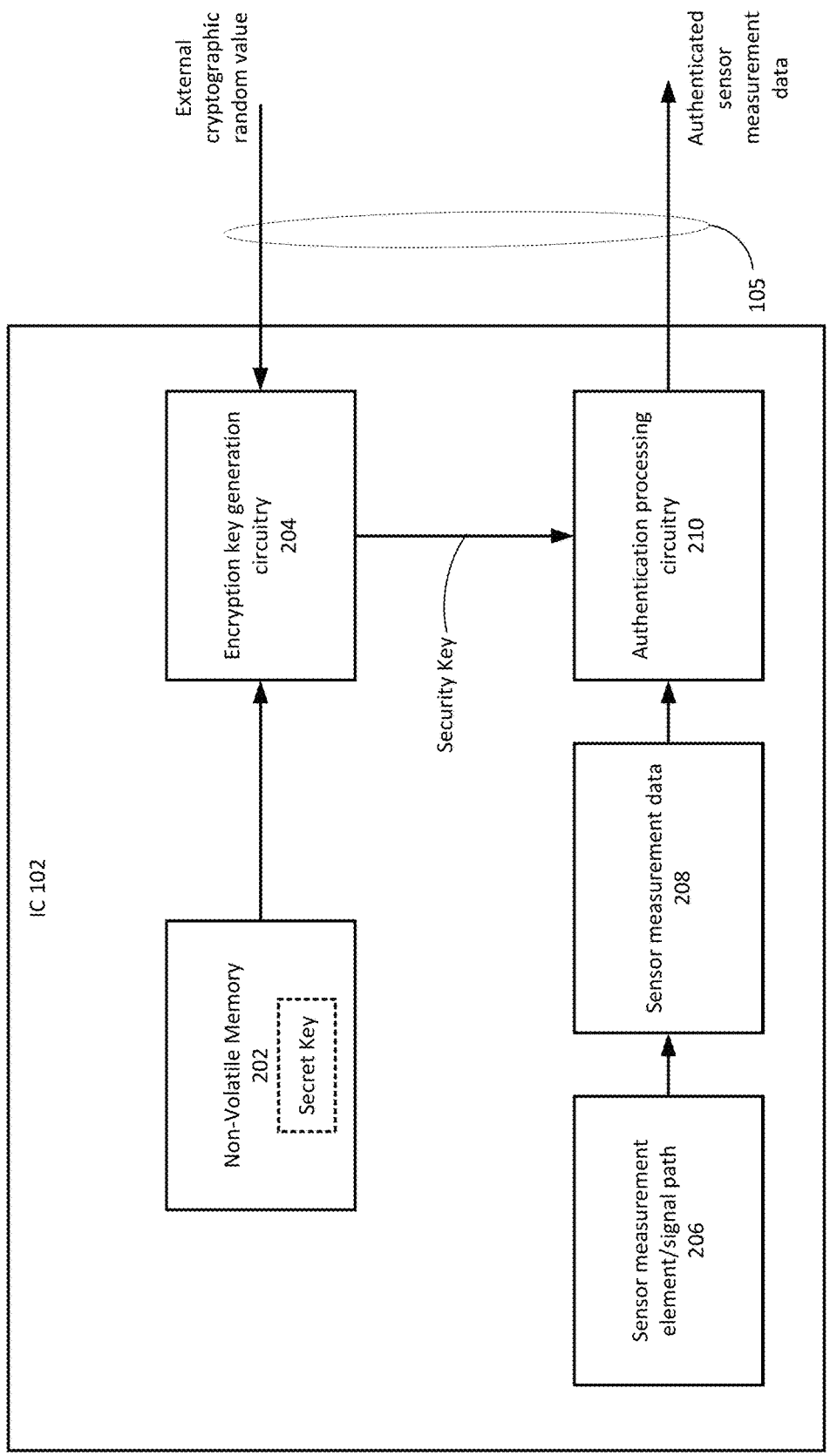
FIG. 2A illustrates an example of a first configuration of a secure sensor protocol interface architecture, in accordance with one or more embodiments of the disclosure.

FIG. 2A illustrates an example of a first configuration of a secure sensor protocol interface architecture, in accordance with one or more embodiments of the disclosure. As shown in FIG. 2A, the IC 102 comprises a sensor measurement element or signal path 206, which may represent different components depending upon the particular implementation of the IC 102. For instance, the IC 102 may include an onboard sensor element that is integrated as part of the IC 102 and locally generates the sensor measurement data. Additionally or alternatively, the sensor element may be located external to the IC 102 and communicatively coupled to the IC 102 via any suitable number and/or type of connections. In such a case, the IC 102 may include the signal path 206, which is configured to receive the sensor measurement data in accordance with an appropriate communication standard.

Regardless of whether the sensor element is integrated as part of the IC 102 or external to the IC 102, the sensor element may represent any suitable type of sensor configured to measure a physical quantity and output a respective sensor signal, which represents this measured physical quantity. The measured physical quantity may be any suitable type or value depending upon the particular implementation of the sensor. For instance, the sensor may be implemented as a magnetic sensor that measures quantities related to a magnetic field orientation, magnetic flux density, magnetic field strength, etc. Thus, when implemented as a magnetic sensor, the sensor may facilitate the measurement of any suitable type of metric using the sensed magnetic quantities such as angular rotation, a present angle of a complementary shaft, angular or linear velocity, etc. Continuing this example, the sensor may be implemented as Hall elements (e.g. vertical Hall probes and/or lateral Hall plates), magneto resistors (e.g. taking advantage of the anisotropic magnetoresistance (AMR), the giant magnetoresistance (GMR), or the tunnel magnetoresistance (TMR)), etc.

In any event, the sensor measurement element or signal path 206, as the case may be, generates the sensor measurement data in accordance with any suitable type of sensor element depending upon the specific implementation and use of the IC 102. To this end, the IC 102 further comprises sensor measurement data circuitry 208, which may represent any suitable number and/or type of hardware and/or software components configured to generate the sensor measurement data in accordance with a particular format, protocol, etc. The sensor measurement data circuitry 208 may implement, for instance, analog-to-digital converters and/or other suitable processing circuitry to condition, format, packetize, etc., the sensor measurement data generated by an integrated or external sensor represented by the sensor measurement element or signal path 206, as the case may be.

As one example, the output of the sensor measurement data circuitry 208 may represent sensor measurement data in the same type of format or protocol that would typically be used to transmit the sensor measurement data in a conventional, i.e. unauthenticated and unsecure, manner. However, the embodiments as discussed herein include the authentication processing circuitry 210 receiving the sensor measurement data generated by the sensor measurement data circuitry 208 and using portions (or the entirety of) the sensor measurement data to generate authentication tags. These authentication tags are then transmitted with the sensor measurement data to facilitate the ECU 104 authenticating sensor measurement data transmissions. The authentication processing circuitry 210 may use several different types of encryption schemes to generate the authentication tags in this manner, the details of which are further discussed below.

Each of the encryption schemes implemented by the authentication processing circuitry 210 to generate the authentication tags may utilize, to some extent, a secret key and the cryptographic random value, which may be received from the ECU 102 (as discussed with reference to FIGS. 2A-2B and 3A-3B) or generated locally via the IC 102 (as discussed with reference to FIGS. 4A-4B). In any event, both the secret key and the cryptographic random value may be known to the IC 102 and the ECU 104 (but otherwise unknown to external devices), and thus the embodiments as discussed herein implement symmetric encryption techniques to reduce the complexity of implementation.

To do so, the IC 102 may comprise a non-volatile memory 202, which may be implemented as any suitable type of non-volatile memory having any suitable size for storing a secret key value, which may represent a predetermined bit string or other suitable encoded numeric value. The secret key may be written to the non-volatile memory 202 as part of a production line process during the manufacturing of the IC 202. Alternatively, the secret key may be written to the non-volatile memory 202 via the ECU 104 or other suitable device. The non-volatile memory 202 is shown and described herein as storing a single secret key value, although this is by way of example and not limitation, as the non-volatile memory 202 may store any suitable number of secret keys, in various embodiments. Again, the secret key(s) stored in the non-volatile memory 202 is/are known by both the IC 102 and the ECU 104 to facilitate the authentication of the transmitted sensor measurement data, as further discussed herein.

In the example shown in FIG. 2A, the IC 102 further comprises encryption key generation circuitry 204, which may be implemented as any suitable type of hardware, software, or combinations of these to generate a security key that is in turn used by the authentication processing circuitry 210 to generate the authentication tag. For example, the encryption key generation circuitry 204 may be implemented as linear feedback shift registers (LFSR), a Solitaire (or Pontifex) cipher, a Secure Hash Algorithm (SHA) such as SHA-2, SHA-224, SHA-256, SHA-384, SHA-512, SHA-512/224, SHA-512/256, a SIPHASH, etc. Thus, the encryption key generation circuitry 204 may receive any suitable number of inputs in accordance with the level of security that is desired and the type of encryption scheme or algorithm that is implemented.

Figure 2B:
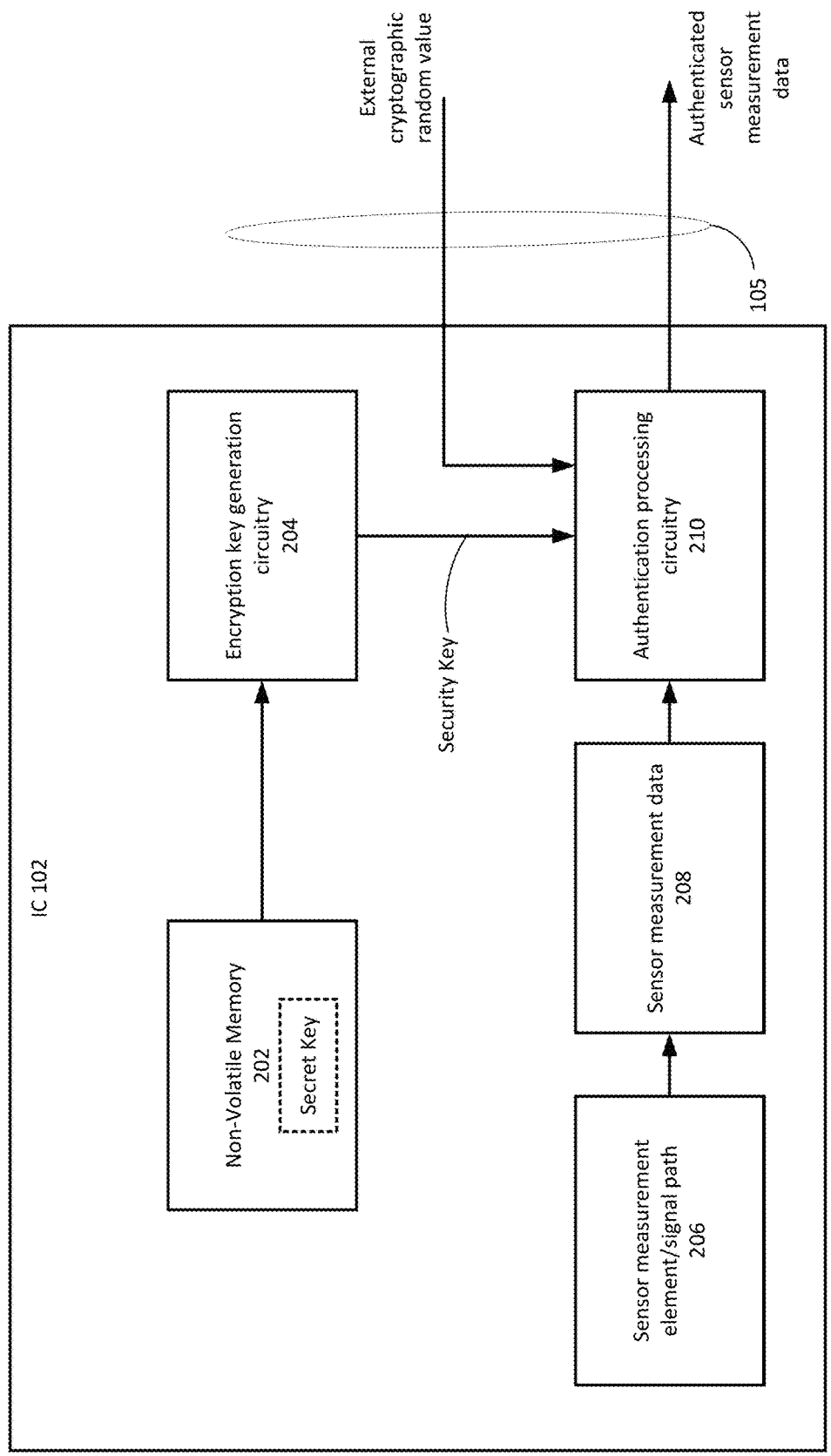
FIG. 2B illustrates an example of a second configuration of a secure sensor protocol interface architecture, in accordance with one or more embodiments of the disclosure.

For example, and as shown in FIG. 2A, the encryption key generation circuitry 204 receives the cryptographic random value from the ECU 104 via the data interface 105, which may comprise a seed or salt value depending upon the particular type of encryption that is implemented. The encryption key generation circuitry 204 also accesses the non-volatile memory 202 to retrieve the secret key. Thus, and as shown in FIG. 2A, the encryption key generation circuitry 204 uses both the secret key and the cryptographic random value to generate a security key. In this scenario, the cryptographic random value may constitute a salt value that is applied to the secret key and used as the initial value by the encryption key generation circuitry 204 to generate the security key. However, as shown in FIG. 2B, the encryption key generation circuitry 204 may alternatively utilize the secret key as the initial value to generate the security key. The security key may thus represent a particular cryptographic value that is generated using any suitable combination of the secret key and the cryptographic random value, which may include the application of hash functions, the use of the cryptographic random value as a salt value with respect to the secret key, the use of the secret key as an initial value to generate the security key, etc.

As another example, and as shown in FIG. 2B, the encryption key generation circuitry 204 may alternatively utilize a single input, i.e. the secret key, to generate the security key. The selection of the number and type of inputs utilized by the encryption key generation circuitry 204 to generate the secret key may be based upon a desired level of security and/or the particular encryption scheme that is implemented. In any event, for both of the implementations as shown in FIGS. 2A and 2B, the encryption key generation circuitry 204 may generate the security key as a one-time security key, which may occur for example upon initialization of the IC 102 using the secret key and, optionally, also utilizing the cryptographic random value. In other words, the security key may be defined only once upon the startup of the IC 102, and is known by the ECU 104 but not known by other components that may interface with the IC 102 and/or the ECU 104 via the data interface 105.

The IC 102 further comprises authentication processing circuitry 210, which may be implemented as any suitable type of hardware, software, or combinations of these to generate an authentication tag from a portion (or the entirety of) the sensor measurement data as discussed herein. The authentication processing circuitry 210 may further comprise any suitable type of hardware and/or software components to facilitate transmitting and/or receiving data to and from the ECU 104 via the data interface 105, which may include drivers, buffers, etc. The authentication processing circuitry 210 is configured to encrypt a portion (or the entirety) of the sensor measurement data to generate the authentication tag in various ways. For instance, the authentication processing circuitry 210 is configured to implement any suitable type of encryption scheme in accordance with any suitable number of data inputs, which may depend upon the particular implementation of the IC 102 and the number of bits identified with the security key and/or the cryptographic random value. For example, the authentication processing circuitry 210 may be configured to generate an authentication tag using a hash function, an Advanced Encryption Standard (AES) (e.g. AES 128 bit, AES 256 bit, etc.), or any other suitable type of encryption scheme that may be applied to a portion of (or the entirety of) the sensor measurement data values to thereby encrypt the sensor measurement data values to generate the authentication tag. The portion of the sensor measurement data values that are encrypted in this manner and used to generate the authentication tags may be a predetermined number of bits from a predetermined portion of the sensor measurement data transmissions, which may be known a priori by the IC 102 and the ECU 1045, as further discussed herein.

For instance, and as shown in FIG. 2A, the authentication processing circuitry 210 may use an AES encryption that implements a security key of any suitable number of bits such that the portion (or entirety) of the sensor measurement data is utilized as plaintext, the security key is used as the AES cipher, and the authentication tag represents the ciphertext after encrypting the sensor measurement data values using the security key. The use of AES encryption is by way of example and not limitation, and any suitable type of encryption algorithm may be implemented. Thus, the authentication processing circuitry 210 may implement a security key that is smaller than, larger than, or equal to the size of the portion of the sensor measurement data values (e.g. in terms of bits) that are encrypted. This may depend upon the particular encryption algorithm that is implemented and/or the size of the portion of the sensor measurement data that is encrypted.

As another example, and as shown in FIG. 2B, the authentication processing circuitry 210 may receive the cryptographic random value from the ECU 104, which may be used to generate the authentication tag in conjunction with the security key. This may be performed in accordance with any suitable type of encryption scheme that encrypts at least a portion of the sensor measurement data values using two inputs, i.e. the security key and the cryptographic random value. Alternatively, and because the cryptographic random value is received directly from the ECU in this embodiment, the authentication processing circuitry 210 may use only the security key to encrypt the sensor measurement data values, and transmit the cryptographic random value back to the ECU 104 as a separate authentication tag or as a separate data transmission. This may be particularly useful in circumstances where transmission of the cryptographic random value from the ECU to the encryption key generation circuitry is rather slow; as in such circumstances it is preferable to limit this type of communication to a minimum or to at least reduce such communications.

Figure 3A:
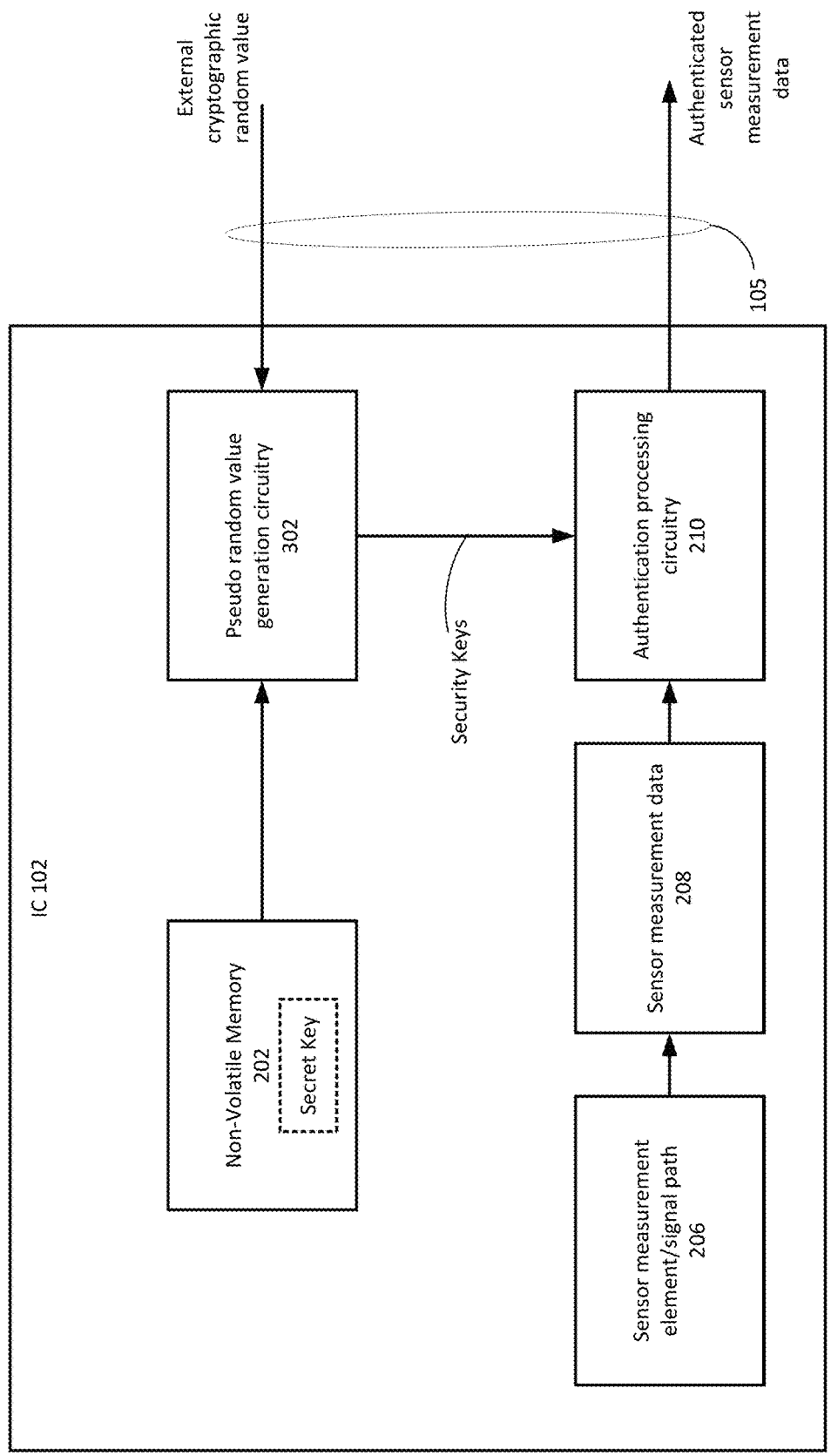
FIG. 3A illustrates an example of a third configuration of a secure sensor protocol interface architecture, in accordance with one or more embodiments of the disclosure.
Figure 3B:
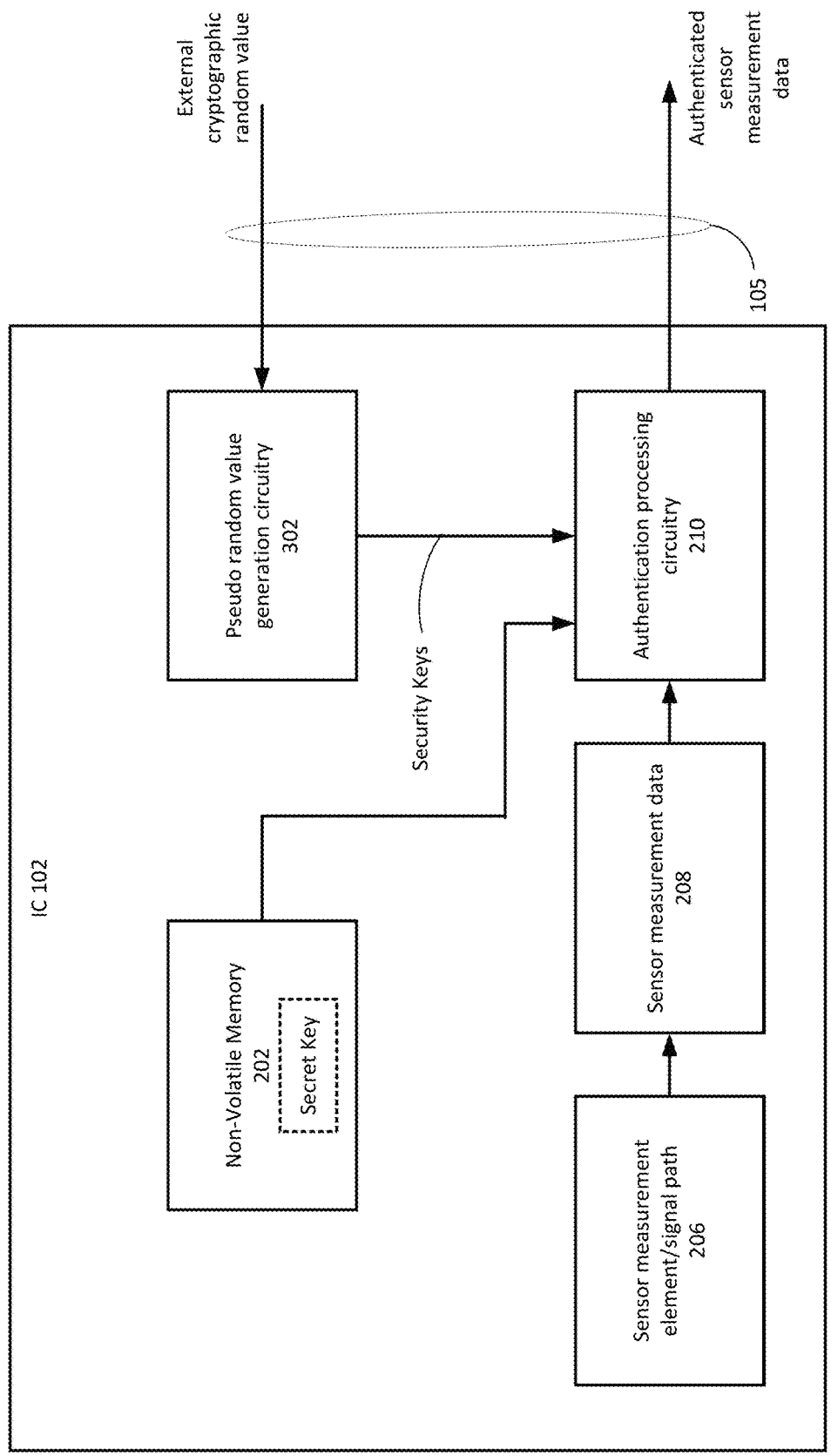
FIG. 3B illustrates an example of a fourth configuration of a secure sensor protocol interface architecture, in accordance with one or more embodiments of the disclosure.

FIGS. 3A and 3B illustrate examples of a third and fourth configuration, respectively, of a secure sensor protocol interface architecture, in accordance with one or more embodiments of the disclosure. The IC 102 as shown in FIGS. 3A and 3B also comprises a non-volatile memory 202 storing a secret key, a sensor measurement or signal path 206, sensor measurement data circuitry 208, and authentication processing circuitry 210, as discussed herein with respect to the IC 102 as shown in FIGS. 2A-2B. Moreover, the IC 102 is configured to communicate with the ECU 104 to receive cryptographic random values from the ECU 104, optionally transmit the cryptographic random values to the ECU 104, and transmit the authentication sensor measurement data to the ECU 102, which includes the authentication tags and sensor measurement data as discussed herein. Thus, only differences between the IC configurations as shown in FIGS. 3A-3B compared to the configurations of the IC 102 as shown in FIGS. 2A-2B are further discussed herein for purposes of brevity.

The configuration of the IC 102 as shown in FIGS. 3A-3B differs from the configuration of the IC 102 as shown in FIGS. 2A-2B with respect to the manner in which the authentication tags are generated by the authentication processing circuitry 210. For instance, the IC 102 as shown in FIGS. 3A-3B implements pseudo random value generation circuitry 302 instead of the encryption key generation circuitry 204 as discussed with respect to FIGS. 2A-2B. In embodiments, the pseudo random value generation circuitry 302 may be implemented using hardware, software, or combinations of these to generate a random number in a deterministic manner that is also known to the ECU 104. For instance, the pseudo random value generation circuitry 302 may be implemented as a pseudorandom number generator (PRNG), which is also known as a deterministic random bit generator (DRBG), and which may employ an algorithm for generating a sequence of numbers having properties that approximate the properties of sequences of random numbers. Thus, the pseudo random value generation circuitry 302 may be configured to generate security keys using sequences of pseudo random number values that are determined from an initial value.

In various embodiments, the initial value used by the pseudo random value generation circuitry 302 to generate the security keys may be pseudo random number sequences that are generated using any suitable combination of the secret key and the cryptographic random value (as shown in FIG. 3A). Alternatively, the initial value may be the cryptographic random value (as shown in FIG. 3B). For example, the pseudo random value generation circuitry 302 may use the cryptographic random value as a seed value that is applied to the secret key to generate the initial value as shown in FIG. 3A, which is in turn used to generate security keys as a pseudo random number sequences. Alternatively, and as shown in FIG. 3B, the pseudo random value generation circuitry 302 may use the cryptographic random value as the initial value for this purpose.

In an analogous fashion as described above with respect to the configuration of the IC 102 as shown in FIGS. 2A-2B, the configuration of the IC 102 as shown in FIGS. 3A-3B may vary with respect to which components of the IC 102 receive and/or utilize the cryptographic random value received form the ECU 104. That is, regardless of the manner in which the security keys are generated by the pseudo random value generation circuitry 302, the authentication processing circuitry 210 may use the security keys and optionally also use the secret key (as shown in FIG. 3B) to generate any suitable number of different authentication tags. The authentication tags may be generated by the authentication processing circuitry 210 in any suitable manner, which may include those as discussed herein with respect to the generation of the authentication tags with respect to FIGS. 2A-2B using any suitable combination of the secret key and the security keys.

As noted above for the secure sensor protocol interface architecture 250 as shown in FIG. 2B, the authentication processing circuitry 210 of the secure sensor protocol interface architecture 350 as shown in FIG. 3B may receive the cryptographic random value from the ECU 104, which may be used to generate the authentication tag in conjunction with a security key. This may be performed in accordance with any suitable type of encryption scheme that encrypts at least a portion of the sensor measurement data values using two inputs, i.e. the secret key and the security key. The authentication processing circuitry 210 may additionally transmit the cryptographic random value back to the ECU 104 as part of a separate authentication tag or as a separate data transmission. This may be particularly useful to provide an added layer of security for communication protocols in which the transmission of data from the ECU to the sensor is slow and/or limited in bandwidth, as mentioned herein.

Because the pseudo random value generation circuitry 302 generates a sequence of different pseudo random number values, the authentication processing circuitry 210 may advantageously generate a number of different authentication tags, with each authentication tag being generated using a different security key in contrast to the use of a one-time generated security key as discussed above with respect to FIGS. 2A-2B. This may be particularly useful, for instance, to increase the level of security by encrypting portions of sensor measurement data from each one of several sensor measurement data transmissions using a different security key. Of course, the authentication processing circuitry 210 may use any suitable number of different security keys in this manner for any suitable number of sensor measurement data transmissions, such as a different security key for each separate sensor data measurement transmission, a different security key for every N number (e.g. 5, 10, 25, 50, etc.) of sensor measurement data transmissions, etc. The authentication processing circuitry 210 may utilize the different security keys in this manner for each of the secure sensor protocol interface architectures 300, 350 as shown in FIGS. 3A and 3B, respectively, which may function to further increase security measures by adding another level of variance to be identified via a malicious user using a replay attack.

Figure 4A:
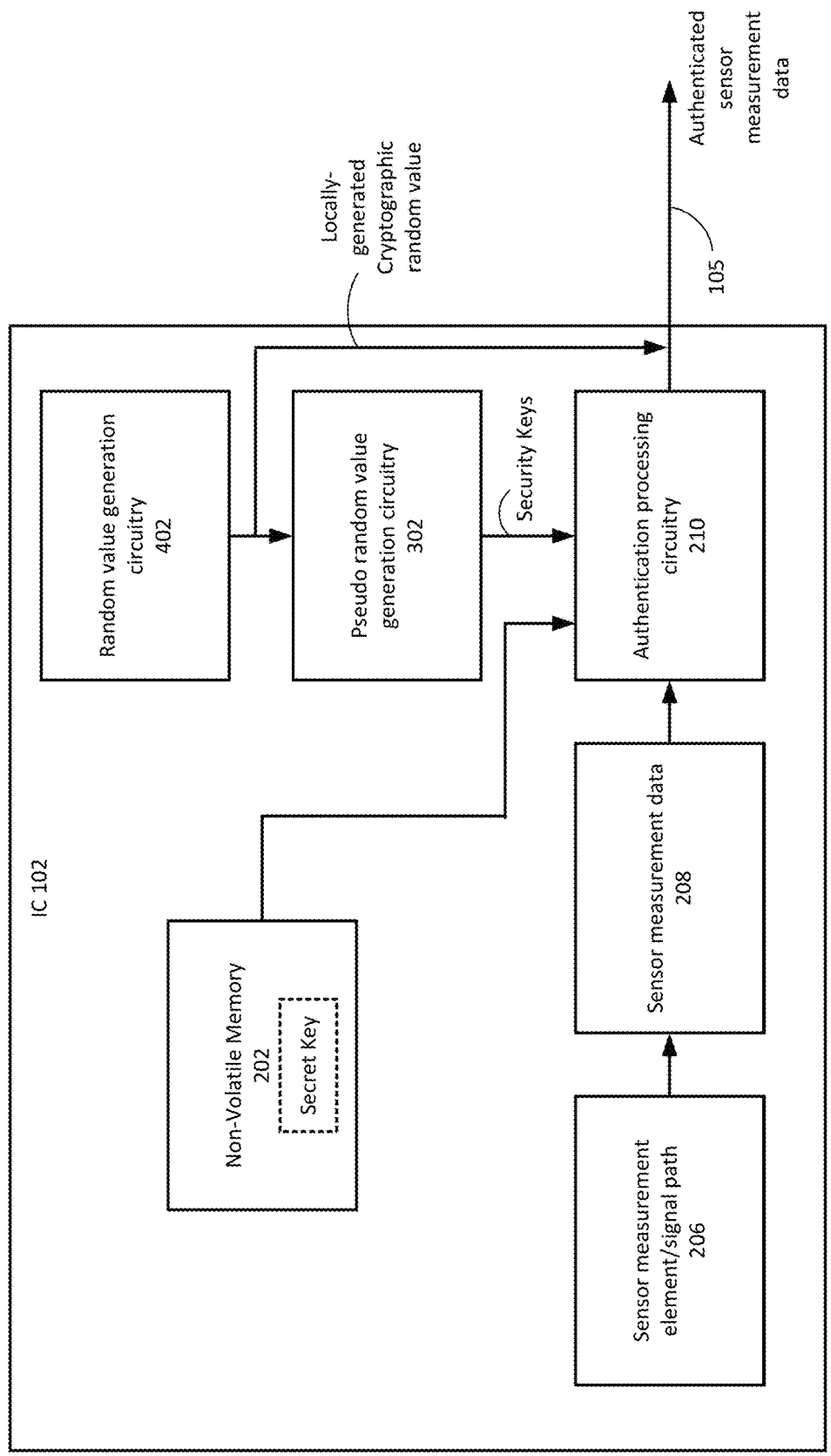
FIG. 4A illustrates an example of a fifth configuration of a secure sensor protocol interface architecture, in accordance with one or more embodiments of the disclosure.
Figure 4B:
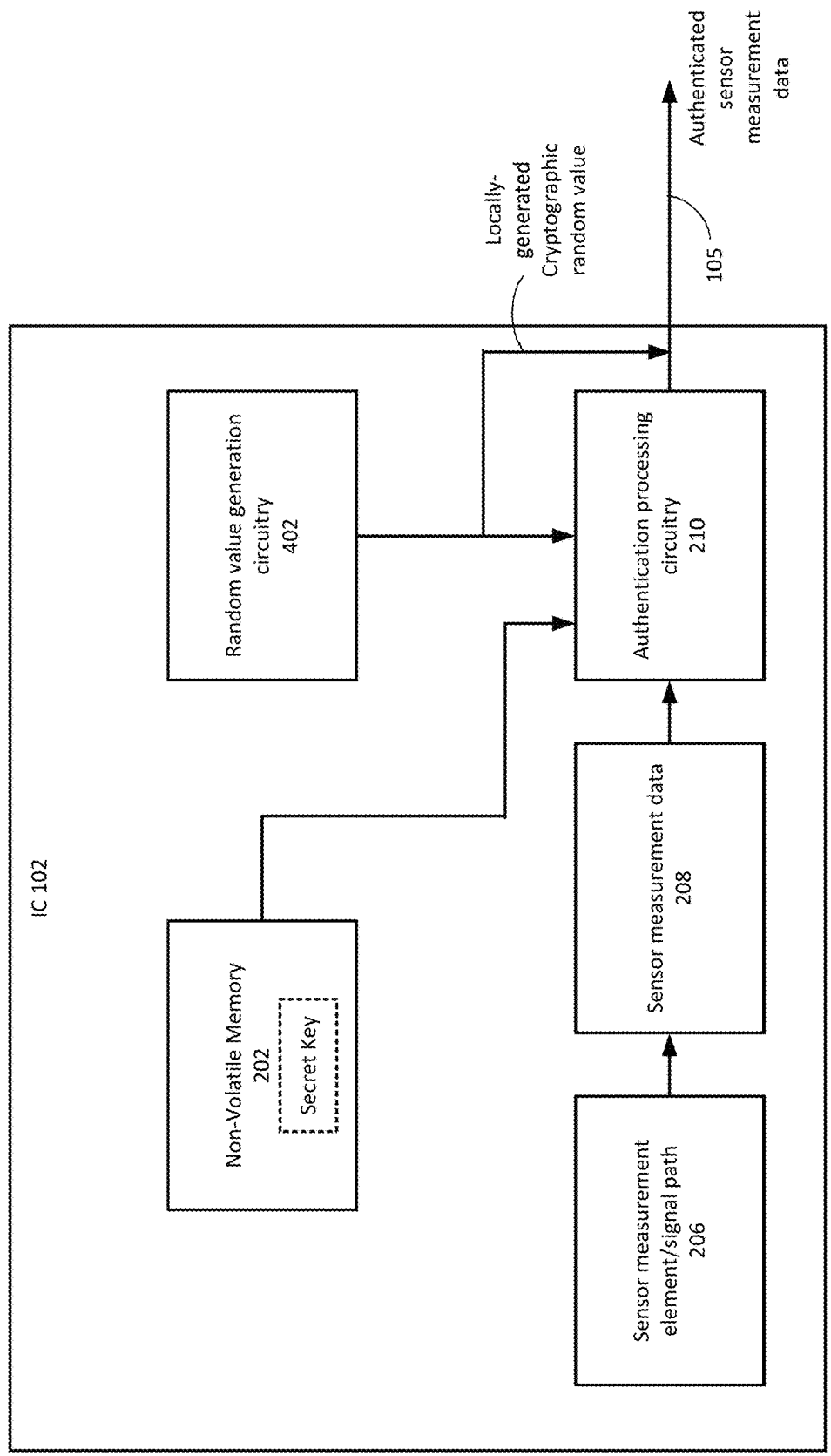
FIG. 4B illustrates an example of a sixth configuration of a secure sensor protocol interface architecture, in accordance with one or more embodiments of the disclosure.

FIGS. 4A and 4B illustrate examples of a fifth and sixth configuration, respectively, of a secure sensor protocol interface architecture, in accordance with one or more embodiments of the disclosure. For the secure sensor protocol interface architectures 400, 450 as shown in FIGS. 4A and 4B, respectively, the IC 102 is also configured to provide generate authentication tags and to transmit authenticated sensor measurement data to the ECU 104. Thus, only differences between the secure sensor protocol interface architectures as shown in FIGS. 4A-4B compared to the secure sensor protocol interface architectures 200, 250, 300, 350 as shown in FIGS. 2A-2B and 3A-3B, respectively, are further discussed herein for purposes of brevity.

The secure sensor protocol interface architectures 400, 450 as shown in FIGS. 4A-4B differ from those shown in FIGS. 2A-2B and 3A-3B with respect to the manner in which the authentication tags are generated by the authentication processing circuitry 210. For instance, the IC 102 as shown in FIGS. 4A-4B implements random value generation circuitry 402 to locally generate the cryptographic random value instead of receiving the cryptographic random value from the ECU 104. In embodiments, the random value generation circuitry 402 may be implemented using hardware, software, or combinations of these to generate a "true" random number value that is non-deterministic. For example, the random value generation circuitry 402 may be implemented to derive random numbers from any suitable source and using any suitable techniques to do so, such as utilizing noise coupled into the IC 102 or received via the data interface 105, for example. Thus, although the cryptographic random value generated by the IC 102 in this manner cannot be known by the ECU 104 in advance or otherwise determined, this is addressed via the authentication processing circuitry 210 transmitting the cryptographic random value to the ECU 104 using the data interface 105. Such a data transmission may occur at any suitable time, such as during initialization of the IC 102 for instance. In this way, both the IC 102 and the ECU 104 may know the cryptographic random value used to generate the authentication tags, as discussed herein with reference to the sensor protocol interface architectures 200, 250, 300, 350 in FIGS. 2A-2B and 3A-3B.

As shown in FIG. 4A, the IC 102 may implement the pseudo random value generation circuitry 302 in addition to the random value generation circuitry 402. As discussed above with reference to FIG. 3B, the pseudo random value generation circuitry 302 may generate any suitable number of security keys using sequences of pseudo random number values that are determined using the cryptographic random value as an initial value, which is generated locally on the IC 102 in this case versus being received form the ECU 104. The local generation of the cryptographic random value may be particularly useful, for instance, when bidirectional communications between the IC 102 and the ECU 104 via the data interface 105 is not desired or feasible.

The authentication processing circuitry 210 as shown in FIG. 4A may thus encrypt a predetermined portion of the sensor measurement data using any suitable encryption schemes as discussed herein to generate the authentication tags. This may be performed in accordance with any suitable type of encryption scheme that encrypts at least a portion of the sensor measurement data values using two inputs, i.e. the secret key and the security key, as noted above with respect to FIG. 3B.

As shown in FIG. 4B, the IC 102 may implement the random value generation circuitry 402 without the pseudo random value generation circuitry 302 as shown in FIG. 4A. In such a configuration, the authentication processing circuitry 210 may encrypt a portion of the sensor measurement data using any suitable encryption schemes as discussed herein to generate the authentication tags. This may be performed in accordance with any suitable type of encryption scheme that encrypts at least a portion of the sensor measurement data values using two inputs, i.e. the secret key and the locally-generated cryptographic random value in this case, in a similar manner as noted above with respect to FIGS. 2B and 3B.

Again, and as discussed herein with respect to FIGS. 2A-2B, 3A-3B, and 4A-4B, the authentication processing circuitry 210 may generate authentication tags in many different ways to facilitate the ECU 104 authenticating sensor measurement data transmissions. Regardless of how the authentication tags are generated, to avoid processing overhead and latency associated with the transmission and authentication of the sensor measurement data, the authentication processing circuitry 210 may be configured to apply the implemented encryption scheme to a predetermined portion of the sensor measurement data to generate the authentication tags. The predetermined portion of the sensor measurement data may include, for example, a predetermined number of bits of the sensor measurement data that is known by the ECU 104. For example, the authentication tag may represent a particular type of encryption as noted herein to a predetermined portion of the sensor measurement data, such as the first 4 bits, the first 8 bits, etc. The selection of the number of predetermined bits used for this purpose may be selected by recognizing a tradeoff between security and the computing resources and latency required to ensure the sensor measurement data transmissions are adequately secured.

Figure 5:
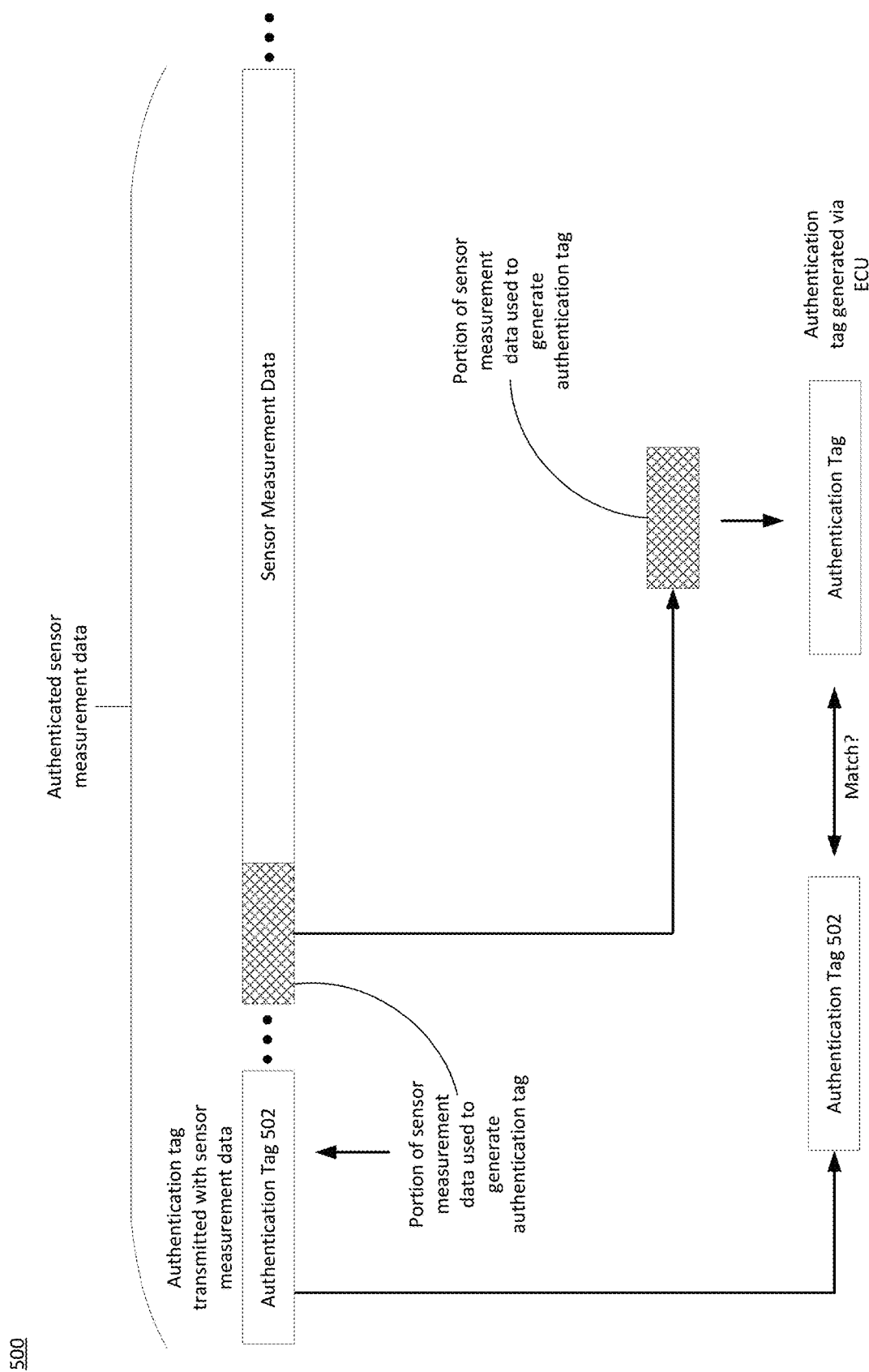
FIG. 5 illustrates an example of sensor data measurement transmission authentication, in accordance with one or more embodiments of the present disclosure.

FIG. 5 illustrates an example of sensor data measurement transmission authentication, in accordance with one or more embodiments of the present disclosure. The authentication tags may be generated for each sensor measurement data transmission or for a lesser number of sensor measurement data transmissions, such as randomly, for every 10, 20, 50, etc. sensor measurement data transmissions. In any event, the authentication tags may represent an encryption, via the authentication processing circuitry 210, of the predetermined portion of sensor measurement data for a particular sensor measurement data transmission. The authentication tags may be transmitted in accordance with the same communication protocol used for the transmission of the sensor measurement data. In various embodiments, the authentication processing circuitry 210 may transmit the authentication tags separately or as part of the same data transmission. For instance, one or more bits, fields, packets, etc. used to transmit sensor measurement data values in accordance with a particular communication protocol may be replaced with the authentication tag data or, alternatively, the authentication tag data may be transmitted as one or more data packets prior to or after the transmission of the sensor measurement data. In any event, the ECU 104 may correlate the received authentication tags to the sensor measurement data and, in particular the portion of the sensor measurement data that was encrypted to generate the authentication tags.

The ECU 104 has knowledge of (e.g. as part of the operation of the processing circuitry thereof, via execution of programmable instructions, etc.) each aspect of the encryption scheme used by the IC 102 to generate the authentication tags. This includes the secret key, the cryptographic random value, the specific type of encryption scheme that is used to generate the security keys, the particular encryption schemes used by the authentication processing circuitry 210 to generate the authentication tags, etc. For instance, symmetric encryption may be utilized such that the ECU 104 may calculate the security keys in a deterministic fashion, which mirror those generated by the IC 102. Thus, and as shown in FIG. 5, the ECU 104 may implement the same type of encryption scheme as the authentication processing circuitry 210 to locally generate an authentication tag using the same portion of the sensor measurement data that was used by the authentication processing circuitry 210 to generate the authentication tag 502 as shown in FIG. 5. The two authentication tags should match one another if the sensor measurement data values are transmitted by an authenticated IC 102, in which case the sensor measurement data transmission is authenticated.

Of course, the ECU 104 may also decrypt the authentication tag 502 to derive the portion of the sensor measurement data that was encrypted by the authentication processing circuitry 210 to generate the authentication tag 502. This may be implemented in accordance with any suitable symmetric encryption and decryption techniques, as the details regarding the encryption of the sensor measurement data are known by the ECU 104 as noted herein. Thus, the sensor measurement data may be authenticated in accordance with such techniques when the sensor measurement data decrypted form the authentication tag 502 matches the predetermined portion of the sensor measurement data that is received by the ECU 104 as shown in FIG. 5.

Again, the cryptographic random value may be changed in accordance with any suitable timing or schedule and exchanged between the IC 102 and the ECU 104 to add another level of authentication security. This may be implemented, for instance, via the IC 102 and the ECU 104 utilizing a predetermined transmission scheme in which the ECU 104 transmits an updated cryptographic random value to the IC 102 or the ECU 104 expects to receive cryptographic random values from the IC 102 in accordance with a predetermined schedule. This may include, for instance, exchanging the cryptographic random value between the IC 102 and the ECU 104 every N sensor measurement data transmissions, upon initialization of the IC 102, when requested by the ECU 104, each time the cryptographic random value is changed, etc.

Additionally or alternatively, the authentication processing circuitry 210 may generate the authentication tags by performing a hash function of sensor measurement data values from a predetermined number of previous sensor measurement data transmissions, which may be optionally encrypted in any suitable manner and used to generate an authentication tag as discussed herein. For example, each sensor measurement data transmission from the IC 102 may encode a sensor measurement data value, and any suitable number (e.g. 10, 20, 50, 100, etc.) of these previously-transmitted sensor measurement data transmissions may be used by the authentication processing circuitry 210 to generate a hash of these values. Any suitable hash function may be used for this purpose, examples of which include SHA-2, SHA-224, SHA-256, SHA-384, SHA-512, SHA-512/224, SHA-512/256, a SIPHASH, etc. The ECU 104 may thus authenticate sensor data transmissions in this way by maintaining a log or otherwise storing the decoded sensor measurement data values from previously-transmitted sensor measurement data transmissions. That is, the ECU 102 may locally perform the same hash function of the same number of sensor data values and authenticate the sensor data transmissions by matching the locally-derived hash value to the hash value transmitted by the IC 102. This technique may be used in addition to the generation of authentication tags via the sensor measurement data as discussed herein, in which case the authentication processing circuitry 210 may transmit the authentication tags based upon the hash values in accordance with a predetermined scheme that is known by the ECU 104.

Figure 6:
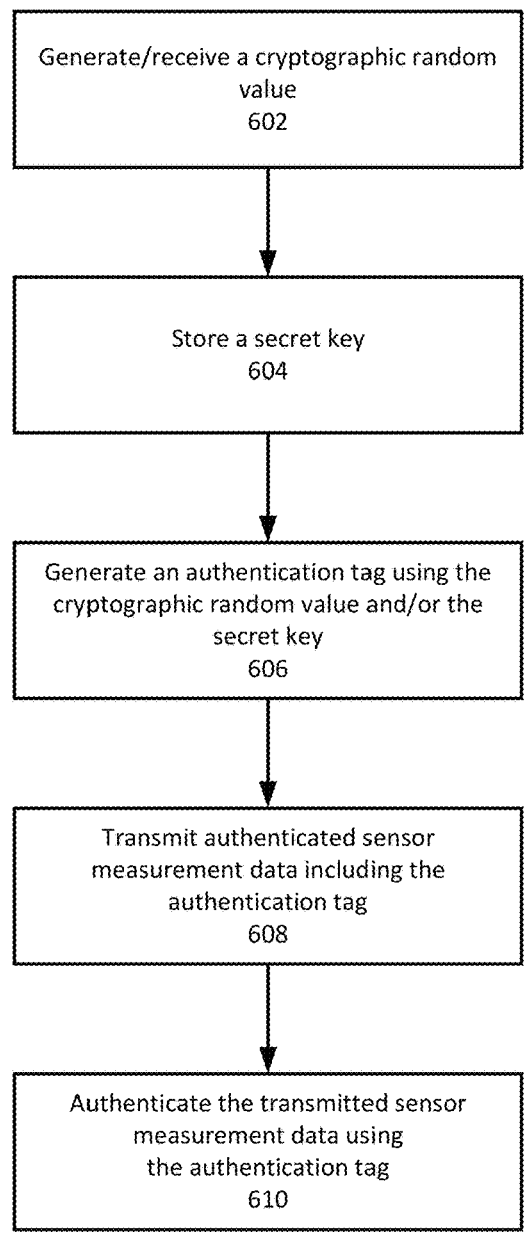
FIG. 6 illustrates an example process flow, in accordance with one or more embodiments of the present disclosure.

FIG. 6 illustrates an example process flow, in accordance with one or more embodiments of the present disclosure. The process flow 600 may be begin when a cryptographic random value is generated (e.g. via the IC 102 or the ECU 104) or received (e.g. by the IC 102 from the ECU 104) (block 602).

The process flow 600 may further include storing (block 604) a secret key. This may include, for instance, storing the secret key in a non-volatile memory of the IC 102, as discussed herein. The secret key may be stored (block 604) in the non-volatile memory of the IC 102 as part of a production line process, written to the non-volatile memory of the IC 102 by the ECU 104, etc.

The process flow 600 may further include generating (block 606) an authentication tag using the cryptographic random value and/or the secret key. This may include the various encryption schemes as discussed herein, which may be implemented by the authentication processing circuitry 210, for instance. Again, the authentication tags may be generated by encrypting at least a portion of the sensor measurement data to be transmitted to the ECU 104.

The process flow 600 may further include transmitting (block 608) the authenticated sensor measurement data to the ECU 104, which may include the authentication tags and the sensor measurement data.

The process flow 600 may further include authenticating (block 610) the transmitted authenticated sensor measurement data. This may be performed for instance, via the ECU 104 by comparing a locally-generated authentication tag to the authentication tag transmitted by the IC 102, by decrypting and comparing the sensor measurement data from the received authentication tag to the transmitted sensor measurement data, etc.

EXAMPLES

The techniques of this disclosure may also be described in the following examples.

Example 1. An integrated circuit (IC) for providing authenticated sensor measurement data, the integrated circuit comprising: a data interface coupled to the IC and to an electronic control unit (ECU), the data interface configured to enable communications between the IC and the ECU; a non-volatile memory (NVM) configured to store a secret key; and authentication processing circuitry configured to generate an authentication tag by encrypting at least a portion of sensor measurement data using a cryptographic random value and the secret key, wherein the authentication processing circuitry is further configured to (i) transmit the authentication tag together with the sensor measurement data as authenticated sensor measurement data, and (ii) selectively transmit the cryptographic random value to the ECU via the data interface in accordance with a communication protocol.

Example 2. The IC of Example 1, further comprising: encryption key generation circuitry configured to generate a one-time security key upon initialization of the IC using the secret key and the cryptographic random value, wherein the authentication processing circuitry is configured to generate the authentication tag by encrypting the at least a portion of the sensor measurement data using the security key.

Example 3. The IC of any combination of Examples 1-2, further comprising: encryption key generation circuitry configured to generate a one-time security key upon initialization of the IC using the secret key, and wherein the authentication processing circuitry is configured to generate the authentication tag by encrypting the at least a portion of the sensor measurement data using the security key and the cryptographic random value.

Example 4. The IC of any combination of Examples 1-3, further comprising: pseudo random value generation circuitry configured to generate a plurality of security keys using the secret key and the cryptographic random value, and wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys.

Example 5. The IC of any combination of Examples 1-4, further comprising: pseudo random value generation circuitry configured to generate a plurality of security keys using the cryptographic random value, wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys and the secret key.

Example 6. The IC of any combination of Examples 1-5, further comprising: random value generation circuitry configured to generate the cryptographic random value; and pseudo random value generation circuitry configured to generate a security key using the cryptographic random value, wherein the authentication processing circuitry is configured to generate the authentication tag by encrypting the at least a portion of the sensor measurement data using the security key and the secret key.

Example 7. The IC of any combination of Examples 1-6, further comprising: random value generation circuitry configured to generate the cryptographic random value, wherein the authentication processing circuitry is configured to generate the authentication tag by encrypting the at least a portion of the sensor measurement data using the cryptographic random value and the secret key.

Example 8. The IC of any combination of Examples 1-7, wherein the authentication processing circuitry is configured to generate the authentication tag by encrypting a predetermined number of bits of the sensor measurement data, which is used by the ECU to authenticate the IC.

Example 9. The IC of any combination of Examples 1-8, wherein the authentication processing circuitry is configured to generate the authentication tag by performing a hash function of sensor measurement data values from a predetermined number of previous sensor measurement data transmissions to generate a hash value, which is used by the ECU to authenticate the IC.

Example 10. The IC of any combination of Examples 1-9, wherein the authentication processing circuitry is configured to selectively transmit the cryptographic random value to the ECU during a synchronization pulse (SYNC) time period in accordance with a Single Edge Nibble Transmission (SENT) communication protocol interface including Short PWM Code (SPC) (SENT/SPC).

Example 11. The IC of any combination of Examples 1-10, wherein the communication protocol comprises one of: a Single Edge Nibble Transmission (SENT) communication protocol; a Single Edge Nibble Transmission (SENT) communication protocol including Short PWM Code (SPC) (SENT/SPC); a Peripheral Sensor Interface 5 (PSI5); a Serial Peripheral Interface (SPI); a Universal asynchronous receiver-transmitter (UART) interface; and a Controller Area Network (CAN bus) interface.

Example 12. The IC of any combination of Examples 1-11, wherein the data interface is a bidirectional data interface.

Example 13. An integrated circuit (IC) for providing authenticated sensor measurement data, the IC comprising: a first data interface coupled to the IC and to an electronic control unit (ECU) and configured to enable communications from the ECU to the IC in accordance with a communication protocol; a second data interface coupled to the IC and to an electronic control unit (ECU) and configured to enable communications from the IC to the ECU in accordance with the communication protocol; a non-volatile memory (NVM) configured to store a secret key; and authentication processing circuitry configured to generate an authentication tag by encrypting at least a portion of sensor measurement data using a cryptographic random value and the secret key, wherein the authentication processing circuitry is further configured to (i) transmit the authentication tag together with the sensor measurement data as authenticated sensor measurement data, and (ii) selectively transmit the cryptographic random value, to the ECU via the second data interface in accordance with the communication protocol.

Example 14. The IC of Example 13, further comprising: encryption key generation circuitry configured to generate a one-time security key upon initialization of the IC using the secret key and the cryptographic random value, wherein the authentication processing circuitry is configured to generate the authentication tag by encrypting the at least a portion of the sensor measurement data using the security key.

Example 15. The IC of any combination of Examples 13-14, further comprising: encryption key generation circuitry configured to generate a one-time security key upon initialization of the IC using the secret key, and wherein the authentication processing circuitry is configured to generate the authentication tag by encrypting the at least a portion of the sensor measurement data using the security key and the cryptographic random value.

Example 16. The IC of any combination of Examples 13-15, further comprising: pseudo random value generation circuitry configured to generate a plurality of security keys using the secret key and the cryptographic random value, and wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys.

Example 17. The IC of any combination of Examples 13-16, further comprising: pseudo random value generation circuitry configured to generate a plurality of security keys using the cryptographic random value, wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys and the secret key.

Example 18. The IC of any combination of Examples 13-17, further comprising: random value generation circuitry configured to generate the cryptographic random value; and pseudo random value generator circuitry configured to generate a security key using the cryptographic random value, wherein the authentication processing circuitry is configured to generate the authentication tag by encrypting the at least a portion of the sensor measurement data using the security key and the secret key.

Example 19. The IC of any combination of Examples 13-18, further comprising: random value generation circuitry configured to generate the cryptographic random value, wherein the authentication processing circuitry is configured to generate the authentication tag by encrypting the at least a portion of the sensor measurement data using the cryptographic random value and the secret key.

Example 20. The IC of any combination of Examples 13-19, wherein the authentication processing circuitry is configured to generate the authentication tag by encrypting a predetermined number of bits of the sensor measurement data, which is used by the ECU to authenticate the IC.

Example 21. The IC of any combination of Examples 13-20, wherein the authentication processing circuitry is configured to generate the authentication tag by performing a hash function of sensor measurement data values from a predetermined number of previous sensor measurement data transmissions to generate a hash value, which is used by the ECU to authenticate the IC.

Example 22. The IC of any combination of Examples 13-21, wherein the authentication processing circuitry is configured to selectively transmit the cryptographic random value to the ECU during a synchronization pulse (SYNC) time period in accordance with a Single Edge Nibble Transmission (SENT) communication protocol interface including Short PWM Code (SPC) (SENT/SPC).

Example 23. The IC of any combination of Examples 13-22, wherein the communication protocol comprises one of: a Single Edge Nibble Transmission (SENT) communication protocol interface; a Single Edge Nibble Transmission (SENT) communication protocol interface including Short PWM Code (SPC) (SENT/SPC); a Peripheral Sensor Interface 5 (PSI5); a Serial Peripheral Interface (SPI); a Universal asynchronous receiver-transmitter (UART) interface; and a Controller Area Network (CAN bus) interface.

Example 24. The IC of any combination of Examples 13-23, wherein the first data interface comprises a test interface of the IC, and the cryptographic random value is received by the IC via the test interface of the IC upon initialization of the IC.

Example 25. The IC of any combination of Examples 13-24, wherein the second data interface comprises a main interface of the IC, and wherein the cryptographic random value is received by the IC via a slow channel data transmission in accordance with one of a Single Edge Nibble Transmission (SENT) communication protocol interface or a SENT communication protocol interface including Short PWM Code (SPC) (SENT/SPC) such that portions of the cryptographic random value are received over successive serial transmissions of the ECU.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. An integrated circuit (IC) for providing authenticated sensor measurement data, the integrated circuit comprising:
  a data interface coupled to the IC and to an electronic control unit (ECU), the data interface configured to enable communications between the IC and the ECU;
  a non-volatile memory (NVM) configured to store a secret key; and authentication processing circuitry configured to generate an authentication tag by encrypting at least a portion of sensor measurement data using a cryptographic random value and the secret key, wherein the authentication processing circuitry is further configured to (i) transmit the authentication tag together with the sensor measurement data as authenticated sensor measurement data, and (ii) selectively transmit the cryptographic random value to the ECU via the data interface in accordance with a communication protocol.

2. The IC of claim 1, further comprising:

encryption key generation circuitry configured to generate a one-time security key upon initialization of the IC using the secret key and the cryptographic random value, wherein the authentication processing circuitry is configured to generate the authentication tag by encrypting the at least a portion of the sensor measurement data using the security key.

3. The IC of claim 1, further comprising:

encryption key generation circuitry configured to generate a one-time security key upon initialization of the IC using the secret key, wherein the authentication processing circuitry is configured to generate the authentication tag by encrypting the at least a portion of the sensor measurement data using the security key and the cryptographic random value.

4. The IC of claim 1, further comprising:

pseudo random value generation circuitry configured to generate a plurality of security keys using the secret key and the cryptographic random value, wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys.

5. The IC of claim 1, further comprising:

pseudo random value generation circuitry configured to generate a plurality of security keys using the cryptographic random value, wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys and the secret key.

6. The IC of claim 1, further comprising:

random value generation circuitry configured to generate the cryptographic random value; and pseudo random value generation circuitry configured to generate a security key using the cryptographic random value, wherein the authentication processing circuitry is configured to generate the authentication tag by encrypting the at least a portion of the sensor measurement data using the security key and the secret key.

7. The IC of claim 1, further comprising:

random value generation circuitry configured to generate the cryptographic random value, wherein the authentication processing circuitry is configured to generate the authentication tag by encrypting the at least a portion of the sensor measurement data using the cryptographic random value and the secret key.

8. The IC of claim 1, wherein the authentication processing circuitry is configured to generate the authentication tag by encrypting a predetermined number of bits of the sensor measurement data, which is used by the ECU to authenticate the IC.

9. The IC of claim 1, wherein the authentication processing circuitry is configured to generate the authentication tag by performing a hash function of sensor measurement data values from a predetermined number of previous sensor measurement data transmissions to generate a hash value, which is used by the ECU to authenticate the IC.

10. The IC of claim 1, wherein the authentication processing circuitry is configured to selectively transmit the cryptographic random value to the ECU during a synchronization pulse (SYNC) time period in accordance with a Single Edge Nibble Transmission (SENT) communication protocol interface including Short PWM Code (SPC) (SENT/SPC).

11. The IC of claim 1, wherein the communication protocol comprises one of:

a Single Edge Nibble Transmission (SENT) communication protocol;

a Single Edge Nibble Transmission (SENT) communication protocol including Short PWM Code (SPC) (SENT/SPC);

a Peripheral Sensor Interface 5 (PSI5);

a Serial Peripheral Interface (SPI);

a Universal asynchronous receiver-transmitter (UART) interface; or a Controller Area Network (CAN bus) interface.

12. The IC of claim 1, wherein the data interface is a bidirectional data interface.

13. An integrated circuit (IC) for providing authenticated sensor measurement data, the IC comprising:

a first data interface coupled to the IC and to an electronic control unit (ECU) and configured to enable communications from the ECU to the IC in accordance with a communication protocol;

a second data interface coupled to the IC and to the ECU and configured to enable communications from the IC to the ECU in accordance with the communication protocol;

a non-volatile memory (NVM) configured to store a secret key; and authentication processing circuitry configured to generate an authentication tag by encrypting at least a portion of sensor measurement data using a cryptographic random value and the secret key, wherein the authentication processing circuitry is further configured to (i) transmit the authentication tag together with the sensor measurement data as authenticated sensor measurement data, and (ii) selectively transmit the cryptographic random value to the ECU via the second data interface in accordance with the communication protocol.

14. The IC of claim 13, further comprising:

encryption key generation circuitry configured to generate a one-time security key upon initialization of the IC using the secret key and the cryptographic random value, wherein the authentication processing circuitry is configured to generate the authentication tag by encrypting the at least a portion of the sensor measurement data using the security key.

15. The IC of claim 13, further comprising:
encryption key generation circuitry configured to generate a one-time security key upon initialization of the IC using the secret key,
wherein the authentication processing circuitry is configured to generate the authentication tag by encrypting the at least a portion of the sensor measurement data using the security key and the cryptographic random value.

16. The IC of claim 13, further comprising:
pseudo random value generation circuitry configured to generate a plurality of security keys using the secret key and the cryptographic random value,
wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys.

17. The IC of claim 13, further comprising:
pseudo random value generation circuitry configured to generate a plurality of security keys using the cryptographic random value,
wherein the authentication processing circuitry is further configured to generate, for each respective one of a plurality of authenticated sensor measurement data transmissions, a different authentication tag by encrypting at least a portion of sensor measurement data used for each respective one of the plurality of authenticated sensor measurement data transmissions using a different respective one of the plurality of security keys and the secret key.

18. The IC of claim 13, further comprising:
random value generation circuitry configured to generate the cryptographic random value; and
pseudo random value generator circuitry configured to generate a security key using the cryptographic random value,
wherein the authentication processing circuitry is configured to generate the authentication tag by encrypting the at least a portion of the sensor measurement data using the security key and the secret key.

19. The IC of claim 13, further comprising:
random value generation circuitry configured to generate the cryptographic random value,
wherein the authentication processing circuitry is configured to generate the authentication tag by encrypting the at least a portion of the sensor measurement data using the cryptographic random value and the secret key.

20. The IC of claim 13, wherein the authentication processing circuitry is configured to generate the authentication tag by encrypting a predetermined number of bits of the sensor measurement data, which is used by the ECU to authenticate the IC.

21. The IC of claim 13, wherein the authentication processing circuitry is configured to generate the authentication tag by performing a hash function of sensor measurement data values from a predetermined number of previous sensor measurement data transmissions to generate a hash value, which is used by the ECU to authenticate the IC.

22. The IC of claim 13, wherein the authentication processing circuitry is configured to selectively transmit the cryptographic random value to the ECU during a synchronization pulse (SYNC) time period in accordance with a Single Edge Nibble Transmission (SENT) communication protocol interface including Short PWM Code (SPC) (SENT/SPC).

23. The IC of claim 13, wherein the communication protocol comprises one of:
a Single Edge Nibble Transmission (SENT) communication protocol interface;
a Single Edge Nibble Transmission (SENT) communication protocol interface including Short PWM Code (SPC) (SENT/SPC);
a Peripheral Sensor Interface 5 (PSI5);
a Serial Peripheral Interface (SPI);
a Universal asynchronous receiver-transmitter (UART) interface; or
a Controller Area Network (CAN bus) interface.

24. The IC of claim 13, wherein the first data interface comprises a test interface of the IC, and the cryptographic random value is received by the IC via the test interface of the IC upon initialization of the IC.

25. The IC of claim 24, wherein the second data interface comprises a main interface of the IC, and
wherein the cryptographic random value is received by the IC via a slow channel data transmission in accordance with one of a Single Edge Nibble Transmission (SENT) communication protocol interface or a SENT communication protocol interface including Short PWM Code (SPC) (SENT/SPC) such that portions of the cryptographic random value are received over successive serial transmissions of the ECU.

* * * * *